(12) United States Patent
Ohta

(10) Patent No.: US 7,339,698 B1
(45) Date of Patent: Mar. 4, 2008

(54) IMAGE PROCESSING METHOD AND APPARATUS

(75) Inventor: Takatoshi Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/340,463

(22) Filed: Jun. 28, 1999

(30) Foreign Application Priority Data

Jul. 2, 1998 (JP) .................................. 10-187579

(51) Int. Cl.
*G06F 15/00* (2006.01)
*H04N 1/40* (2006.01)

(52) U.S. Cl. ...................................... 358/1.9; 358/3.01

(58) Field of Classification Search ................. 358/1.9, 358/1.2, 1.12, 1.14, 1.18, 501, 502, 504, 358/523, 3.01, 3.1, 3.23
See application file for complete search history.

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,723,129 A | 2/1988 | Endo et al. | 346/1.1 |
| 4,740,796 A | 4/1988 | Endo et al. | 346/1.1 |
| 5,621,542 A * | 4/1997 | Ohta et al. | 358/455 |
| 5,751,929 A | 5/1998 | Ohnuma et al. | 395/129 |

FOREIGN PATENT DOCUMENTS

| | | |
|---|---|---|
| JP | 58-215169 | 12/1983 |
| JP | 59-123670 | 7/1984 |
| JP | 59-138461 | 8/1984 |
| JP | 61-52073 | 3/1986 |
| JP | 61-293068 | 12/1986 |
| JP | 63-35074 | 2/1988 |
| JP | 63-155950 | 6/1988 |
| JP | 08190360 A * | 7/1996 |

* cited by examiner

*Primary Examiner*—Douglas Q. Tran
(74) *Attorney, Agent, or Firm*—Fitzpatrick, Cella, Harper & Scinto

(57) ABSTRACT

An image processing method and apparatus using an input unit for inputting image data, a processing unit for quantizing error-correction data obtained by adding error data to the image data input by the input unit so that data having at least two levels are generated, and an allocation unit for allocating the error data generated when the quantization is performed to image data which are not quantized. In response to a predetermined level of the error-correction data, the processing unit outputs, as a result of quantization, a different level from a level resulting from fundamental processing for the predetermined level so as to prevent a pseudocontour from being generated.

9 Claims, 9 Drawing Sheets

•— ERROR ALLOCATION WINDOW FOR PROCESSING IN THE DIRECTION OF THE ARROW POINTING TO THE RIGHT

•— ERROR ALLOCATION WINDOW FOR PROCESSING IN THE DIRECTION OF THE ARROW POINTING TO THE LEFT

ERROR ALLOCATION COEFFICIENTS

|  | e0 | e1 | e2 | e3 | o0 | o1 |
|---|---|---|---|---|---|---|
| 297 | 5376 | 2982 | 1554 | 840 | 1 | 1 |
| 296 | 5248 | 2911 | 1517 | 820 | 1 | 1 |
|  |  |  |  |  |  |  |
| 256 | 128 | 71 | 37 | 20 | 1 | 1 |
| 255 | 0 | 0 | 0 | 0 | 1 | 1 |
| 254 | -128 | -71 | -37 | -20 | 1 | 1 |
|  |  |  |  |  |  |  |
| 213 | -5376 | -2982 | -1554 | -840 | 1 | 1 |
| 212 | 5376 | 2982 | 1554 | 840 | 1 | 0 |
|  |  |  |  |  |  |  |
| 171 | 128 | 71 | 37 | 20 | 1 | 0 |
| 170 | 0 | 0 | 0 | 0 | 1 | 0 |
| 169 | -128 | -71 | -37 | -20 | 1 | 0 |
|  |  |  |  |  |  |  |
| 128 | -5376 | -2982 | -1554 | -840 | 1 | 0 |
| 127 | 5376 | 2982 | 1554 | 840 | 0 | 1 |
|  |  |  |  |  |  |  |
| 100 | -8960 | -4970 | -2590 | -1400 | 1 | 0 |
|  |  |  |  |  |  |  |
| 86 | 128 | 71 | 37 | 20 | 0 | 1 |
| 85 | 0 | 0 | 0 | 0 | 0 | 1 |
| 84 | -128 | -71 | -37 | -20 | 0 | 1 |
|  |  |  |  |  |  |  |
| 43 | -5376 | -2982 | -1554 | -840 | 0 | 1 |
| 42 | 5376 | 2982 | 1554 | 840 | 0 | 0 |
|  |  |  |  |  |  |  |
| 1 | 128 | 71 | 37 | 20 | 0 | 0 |
| 0 | 0 | 0 | 0 | 0 | 0 | 0 |
| -1 | -128 | -71 | -37 | -20 | 0 | 0 |
|  |  |  |  |  |  |  |
| -41 | -5248 | -2911 | -1517 | -820 | 0 | 0 |
| -42 | -5376 | -2982 | -1554 | -840 | 0 | 0 |

FIG. 6

○ DOT REPRESENTING LEVEL 0

◉ DOT REPRESENTING LEVEL 1

● DOT REPRESENTING LEVEL 2

○ DOT REPRESENTING LEVEL 0

◉ DOT REPRESENTING LEVEL 1

● DOT REPRESENTING LEVEL 2

IMAGE PROCESSING METHOD AND APPARATUS

BACKGROUND OF THE INVENTION

1. Field of the Invention

The present invention relates to image processing methods and apparatuses, and in particular, to an image processing method and apparatus that quantizes input data to generate binary or multilevel data, while storing the difference between an input-image density and an output-image density by using a method such as error diffusion.

2. Description of the Related Art

Error diffusion is known as a conventional pseudohalftone process that expresses input multilevel data in binary levels or a number of levels less than the levels of the input multilevel data. This error diffusion has been proposed in "An Adaptive Algorithm for Spatial Gray Scale", Society for Information Display 1975 Symposium, Digest of Technical Papers, 1975, 36. In such an error diffusion process, when a pixel of interest is represented by P, the density of that pixel of interest is represented by v. Pixels around pixel P which are not binarized are represented by P0, P1, P2, and P3. The densities of pixels P0, P1, P2, and P3 are respectively represented by v0, v1, v2, and v3, and a threshold value for binarization is represented by T. The average density of an output image is macroscopically equalized to the density of an input image by weighting a binarized error E at pixel P using obtained weight coefficients W0, W1, W2, and W3 by experience, and allocating the obtained values to pixels P0, P1, P2, and P3, respectively.

When the output binary data is o, errors E0, E1, E2, and E3 for respective pixels P0, P1, P2, and P3 can be obtained by the following numerical expressions:

If $v \geq T, o=1, E=v-V\max$; and

If $v<T, o=0, E=v-V\min$ (where Vmax represents a maximum density; and Vmin represents a minimum density); and $E0 = E \times W0$;

$E1 = E \times W1$;

$E2 = E \times W2$; and $E3 = E \times W3$ (Examples of weight coefficients: $W0=7/16$, $W1=1/16$, $W2=5/16$, and $W3=3/16$).

Error Diffusion has the Following Problems:

Realization of the method by a logic circuit enlarges the circuit size because each weight coefficient needs a multiplier and a divider, as will be understood from the above-described example, and when an integer arithmetic operation is performed, the average density of the output image is not equal to the density of the input image due to the resultant rounding error (E−(E0+E1+E2+E3)).

Concerning methods for solving the above-described problems, Japanese Patent Laid-Open Nos. 58-215169, 61-52073, and 61-293068 have proposed that by setting weight coefficients at fractions of the powers of 2, the circuit size is reduced using shift registers in place of multipliers and dividers. Japanese Patent Laid-Open No. 63-35074 discloses that by determining pre-weighted binarized errors for density information values, and setting the total of the errors to be equal to the binarized error, simplification of multiplication and division, and elimination of rounding errors are achieved.

In addition, Japanese Patent Laid-Open No. 63-155950 has proposed that the average density of an output image is equalized to the density of an input image by adding a rounding error to weighted pixels around a pixel of interest.

Problems with these Methods are as Follows:

In the method using shift registers, flexibility is limited due to the fixing of the weight coefficients to fractions of the powers of 2. In the method in which pre-weighted binarized errors are determined and the rounding error is added to errors to be allocated to weighted pixels around the pixel of interest so that the total of the pre-weighted binarized errors is equal to the binary error, the average density of the output image is equal to the density of the input image, but the rounding error is zero or greater than at least 1 due to implementation of integer arithmetic operations. This causes deterioration in the image quality of a highlight that is easily affected by the error allocation.

Moreover, a conventional method of quantizing input multilevel data to generate data having at least three levels by using error diffusion is also known. In the case where this method is employed in an ink-jet printer, or the like, that expresses pseudo-gradations by using a plurality of inks having identical hues and different concentrations, as shown in FIG. 7, after inputting input image data to look-up tables (LUTs) 15-0 to 15-N corresponding to the respective inks for density correction, it is required that the image data be input to separate binarization circuits 16-0 to 16-N so that binarization for the inks is performed. Accordingly, a problem arises in that if the number of inks increases, the amount of processing is increased, and also the processing circuit is enlarged. A similar problem such as enlargement of the processing circuit occurs in the case of a combination of error diffusion and at least one of a recording means that uses the same type of ink and has an N-fold resolution in a main-scan direction, a recording means that has the same resolution and performs recording twice in the same dot recording position, a multidroplet method that performs recording by changing the dot diameter of ink, and a density pattern method that uses a plurality of recording dots to express one pixel.

In U.S. Pat. No. 5,621,542, an image processing method and apparatus has been proposed to eliminate the above-described problems. In this image processing method and apparatus, when input image data is quantized to generate data having at least three levels, a rounding error generated in the weighting of error data is set to be less than 1, whereby image quality, particularly highlight image quality, is increased. In the case where a plurality of inks or dots is used for pseudogradation expression, input image data is quantized to generate data having at least three levels by error diffusion using a simple circuit structure.

FIGS. 8 and 9 illustrate 4-level quantization adapted for a recording apparatus that performs recording by changing the diameter of an ink dot in three stages. FIG. 8 shows relationships among input values, errors, and output levels.

In FIG. 8, the left scale indicates a possible range of the sums of the input values and the errors, and divisions 42, 127, and 212 respectively indicate threshold values for distinguishing between output levels 0 and 1, 1 and 2, and 2 and 3, respectively. In the center column of FIG. 8, possible positive and negative ranges of errors are shown. Each black circle indicates that the indicated point is included in a range, and each blank circle indicates that the indicated point is not included in a range.

The right column of FIG. 8 shows how output levels 0, 1, 2, and 3 are output for the sums of the input values and the errors.

In FIG. 8, by way of example, the case where the sum of an input value and an error is a threshold value of 42 or less is considered. When the sum is not less than −42 and not more than 0, the output level is zero, and the sign of the error is negative. When the sum is more than zero and not more than 42, the output level is zero, and the sign of the error is positive.

In the case where the sum of an input value and an error is more than 42 and not more than a threshold value of 127, when the sum is more than 42 and not more than 85, the output level is 1, and the sign of the error is negative. When the sum is more than 85 and not more than 127, the output level is 1, and the sign of the error is positive.

FIG. 9 shows ranges in which output levels for 8-bit input values appear. In error diffusion, even if an input value has a length of eight bits, the error is between −42 and +42 when the input value is quantized to generate 4-level data, as shown in FIG. 9. Thus, outputs having different two levels appear for one input value.

By way of example, when the input value is 120, the sum of the input value and the error is not less than 78 (120−42) and not more than 162 (120+42). Accordingly, it is clear from FIG. 9 that levels 1 and 2 can appear as output values, and the frequencies of the levels 1 and 2 are 58.8% ((127−77)/(162−77)×100) and 41.2% ((160−127)/(162−77)×100), respectively.

In such error diffusion, as is clear from FIG. 9, output values for an input value are nothing but pseudoexpressions based on the appearance frequencies of two consecutive output levels. For example, the case where a pattern having consecutively changing gradations from 0 to 255 is input for quantization to 4-level data is considered. The output starts at initial level 0, and changes through the overlapping range of levels 0 and 1, the overlapping range of levels 1 and 2, and the overlapping range of levels 2 and 3, to the range of level 3 alone. Here, when a manner of arranging ink dots expressed in level 2 is considered, it is found that after ink dots expressed in level 1 are always arranged in all ink-dot positions, ink dots expressed in level 2 are alternately arranged for the level-1 dots, as shown in FIG. 10.

At this time, in the case where the difference between the densities of inks expressed in levels 1 and 2, or the difference between the diameters of the ink dots, etc., is so large as to be perceived by a human eye, a problem occurs in that the level-2 dots are arranged instead of the level-1 dots are perceived as a pseudocontour which is not preferable for the human eye. This causes a further problem in that also when an image is expressed in binary, perceptible dots suddenly appear from a certain density and the dots form a pseudocontour.

SUMMARY OF THE INVENTION

Accordingly, in order that the above-described problems may be eliminated, it is an object of the present invention to provide an image processing method and apparatus in which, in the case where image-density-storing quantization such as error diffusion is used to quantize input image data so that data having at least two levels are generated, when the sum of an input value and an error is a predetermined value, simplified processing is used to prevent a pseudocontour from noticeably appearing by outputting a different value from a fundamental quantized data to be output.

According to one aspect of the present invention, the foregoing object is achieved through provision of an image processing apparatus including an input unit for inputting image data, a processing unit for quantizing error-correction data obtained by adding error data to the image data input by the input unit so that data having at least two levels are generated, and an allocation unit for allocating the error data generated when the quantization is performed to image data which are not quantized. In response to a predetermined level of the error-correction data, the processing unit outputs, as a result of quantization, a different level from a level resulting from fundamental processing for the predetermined level so as to prevent a pseudocontour from being generated.

According to another aspect of the present invention, the foregoing object is achieved through provision of an image processing method for allocating, as a quantized error, the difference between an input image density and a quantized image density to surrounding pixels around a pixel of interest, and setting the average of the quantized densities to be equal to the input image density. This image processing method includes a first step for finding error correction data by adding the input image density and error data allocated from the surrounding pixels, and a second step for outputting, based on the error correction data obtained in the first step, error data and predetermined quantized data for the surrounding pixels, which are prestored in a table. In the table, a different level from a level resulting from fundamental processing in accordance with a predetermined level of the error correction data is stored as quantized data.

Other features and advantages of the present invention will be apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 6 is a detailed error allocation table according to an embodiment of the present invention;

DESCRIPTION OF THE PREFERRED EMBODIMENT

A preferred embodiment of the present invention is described below with reference to the accompanying drawings.

Figure 1:
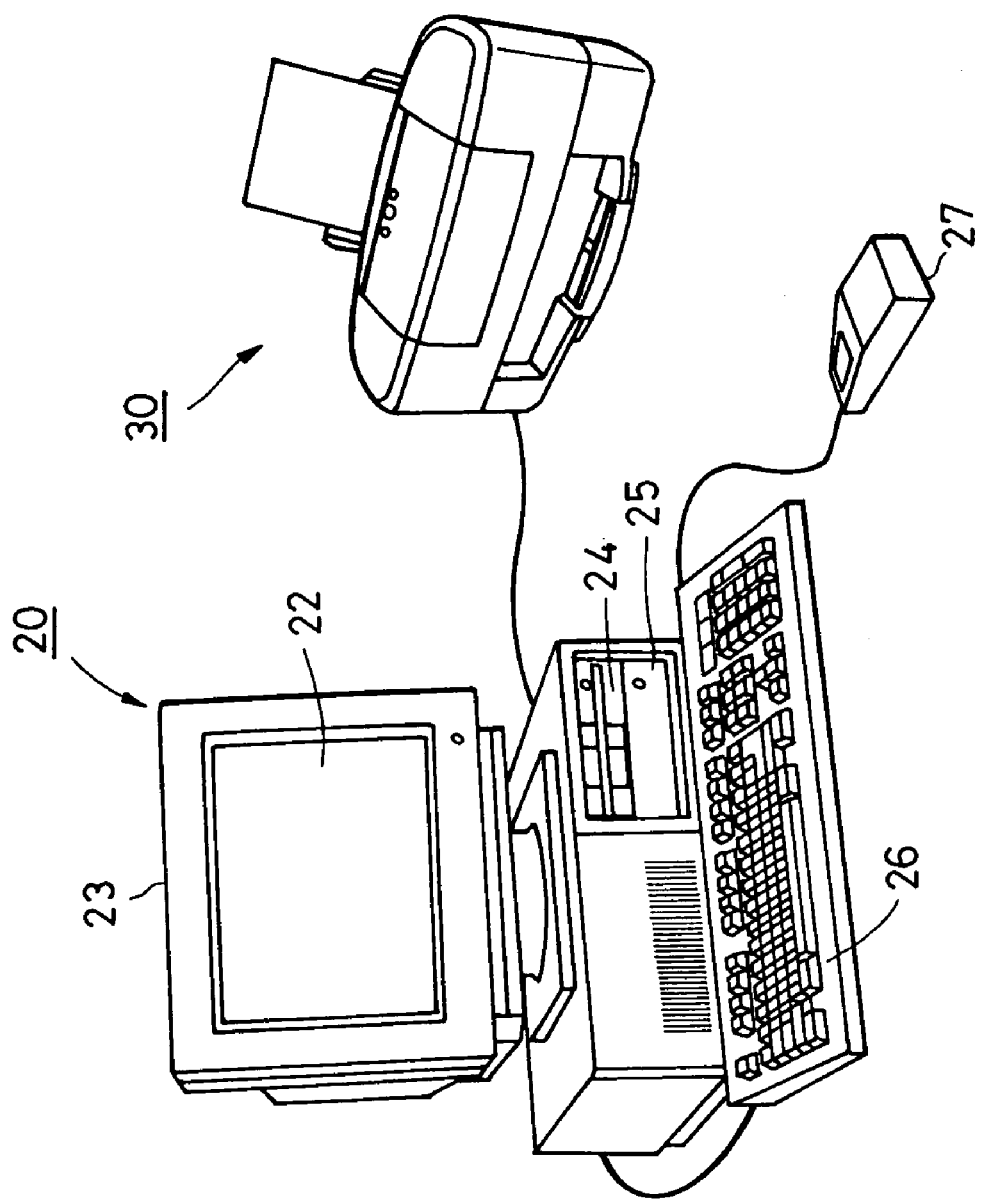
FIG. 1 is a view showing a computer system according to an embodiment of the present invention.

FIG. 1 shows a computer system 20 used in connection with an embodiment of the present invention. The computer system 20 includes a host processor 23. The computer system 20 includes, which may be a display 22 as a color monitor, a keyboard 26 for inputting text data and user commands, and a pointing device 27. The pointing device 27 is preferably a mouse for designating or operating an object displayed on the display 22.

The computer system 20 includes a computer-readable memory-medium drive such as a floppy disk drive 24 and a computer disk drive 25. The floppy disk drive 24 has a function for allowing information (such as data and application program) stored on a floppy disk to be accessed. The computer system 20 may include a CD-ROM interface (not shown) having a similar function, and the CD-ROM interface allows information stored in a CD-ROM to be accessed.

A printer 30 is preferably a color ink-jet printer that forms an image by discharging droplets of ink onto a recording medium such as paper or a transparent sheet. One of preferable printers is described in U.S. patent application Ser. No. 08/972,113 entitled "Multi-Head Printing with Differing Resolution". This application is incorporated for reference as fully described in the present application. The printer 30 may be another type of printer that forms an image on a recording medium by arranging dots having at least one gradation level, such as a laser beam printer, a thermal printer, a dot-matrix printer, or a multihead ink-jet printer.

Figure 2:
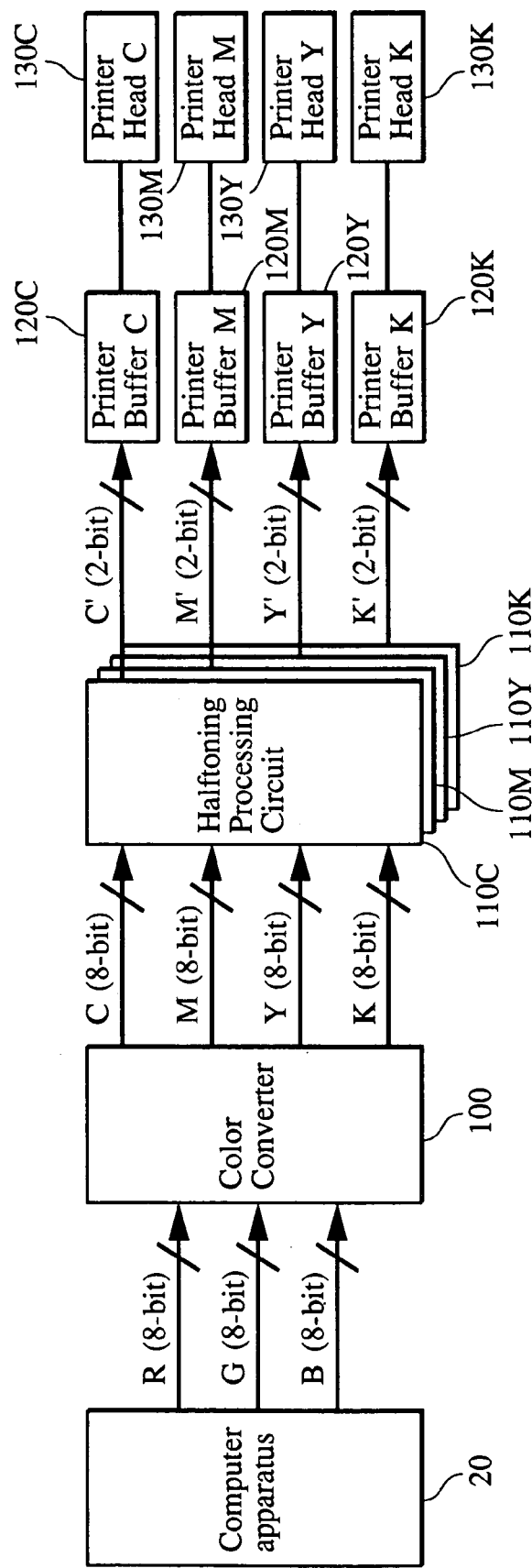
FIG. 2 is a schematic block diagram showing an image processing system according to an embodiment of the present invention.

FIG. 2 is a block diagram showing an image processing system according to the present invention.

In FIG. 2, the computer system 20 shown in FIG. 1 is denoted by reference numeral 20. The computer system 20 sends 8-bit red (R) data, 8-bit green (G) data, and 8-bit blue (B) data created by various application programs to the printer 30.

A color converter 100, halftoning processing circuits 110C, 110M, 110Y, and 110K, printer buffers 120C, 120M, 120Y, and 120K, and printer heads 130C, 130M, 130Y, and 130K, which are shown in FIG. 2, are provided in the printer 30.

The color converter 100 converts the 8-bit R, G, and B data from the computer system 20 into 8-bit cyan (C) data, 8-bit magenta (M) data, 8-bit yellow (Y) data, and 8-bit black (K) data.

The halftoning processing circuits 110C, 110M, 110Y, and 110K convert the 8-bit C, M, Y, and K data from the color converter 100 into 2-bit data, respectively.

The printer buffers 120C, 120M, 120Y, and 120K temporarily store the respective 2-bit data from the halftoning processing circuits 110C, 110M, 110Y, and 110K.

Based on the 2-bit data stored in the printer buffers 120C, 120M, 120Y, and 120K, the printer heads 130C, 130M, 130Y, and 130K perform recording using large, intermediate, and small dots for a pixel (no recording is performed when the 2-bit data are zeros).

Figure 3:
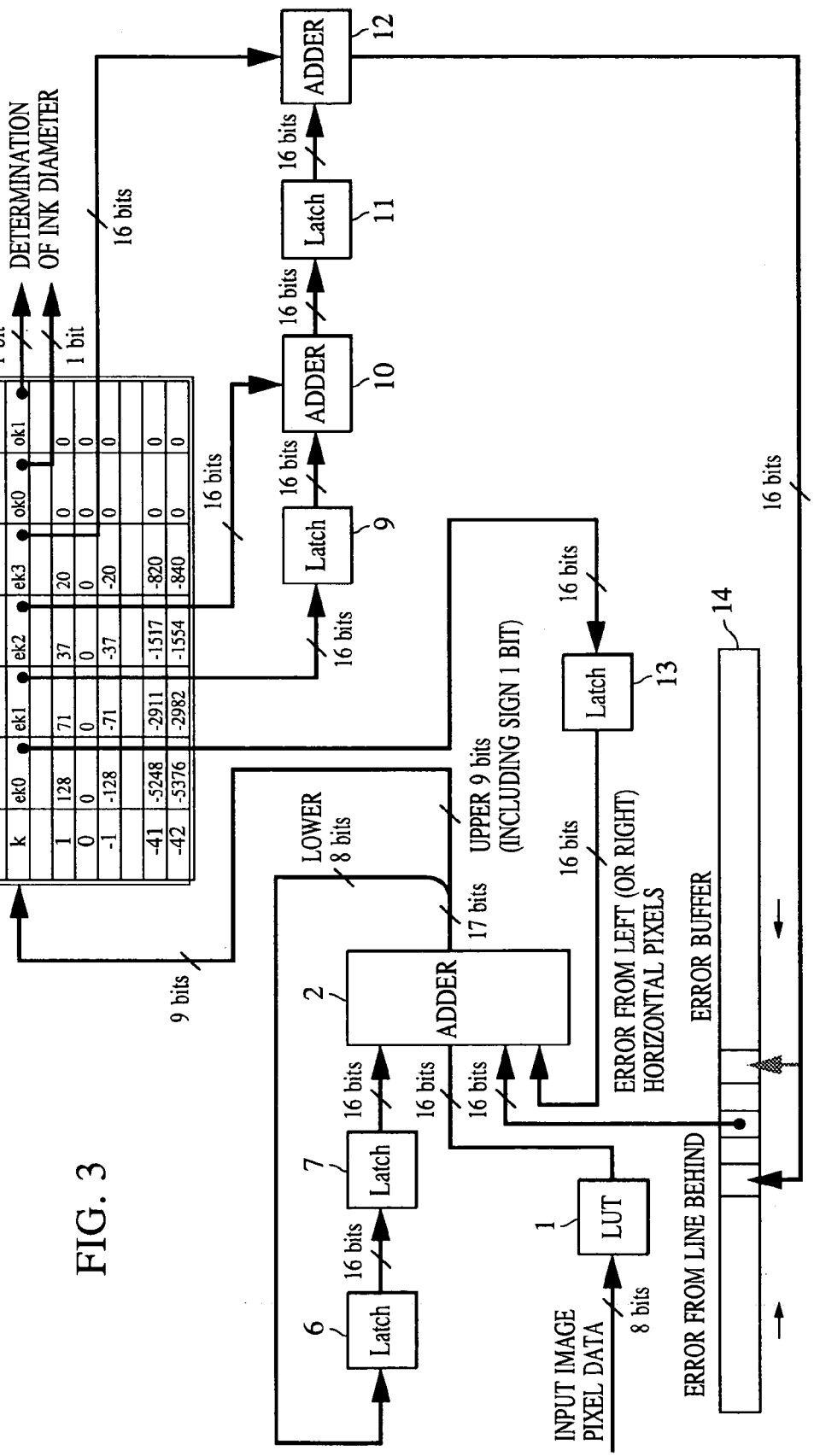
FIG. 3 is a detailed block diagram showing an image processing apparatus according to an embodiment of the present invention.

FIG. 3 shows the detailed structure of the halftoning processing circuit 110C shown in FIG. 2.

Also the structures of the other halftoning processing circuits 110M, 110Y, and 110K are identical to that shown in FIG. 3.

In this embodiment, the case where pseudogradation is expressed using three dot diameters, large, intermediate, and small sizes, in other words, the case where input image data are quantized to generate four levels is described below. However, the present invention can be applied to cases other than quantization of input image data into four levels.

Referring to FIG. 3, input image pixel data (from the left of the drawing) as 8-bit multilevel image data is input to a look-up table (LUT) 1.

The LUT 1 is a table for compensating the linearity of an output based on input data for which pseudogradation processing is performed, and outputs a 16-bit value for an 8-bit input value.

Figure 5:
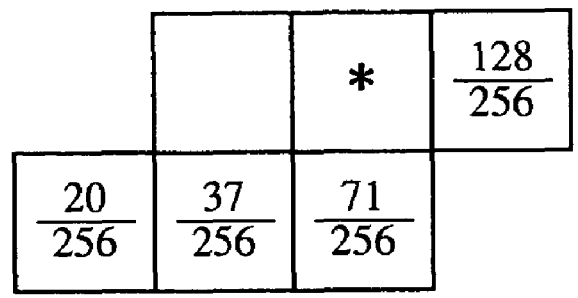
FIG. 5 is a drawing showing error allocation coefficients according to an embodiment of the present invention.
Figure 7:
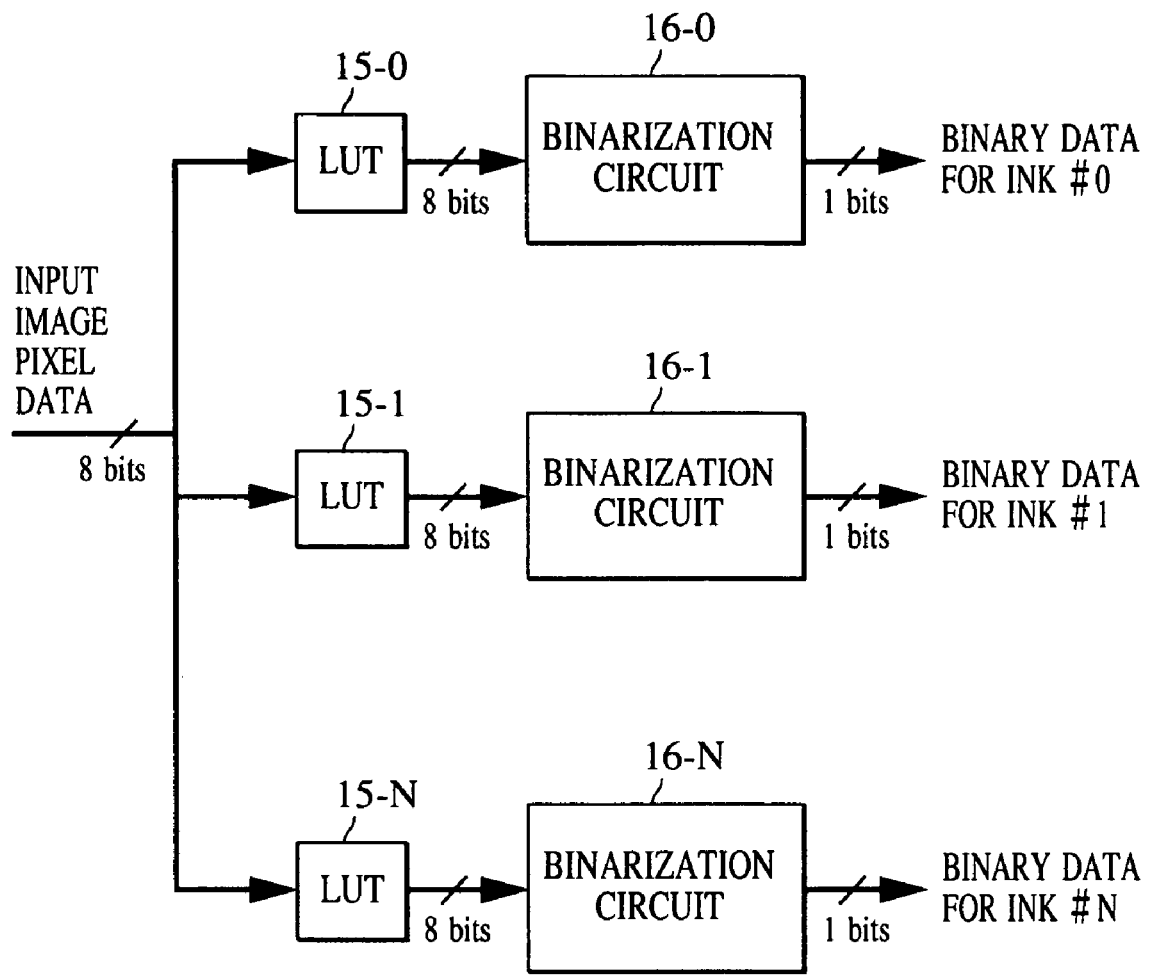
FIG. 7 is a block diagram showing conventional processing using a plurality of inks.
Figure 8:
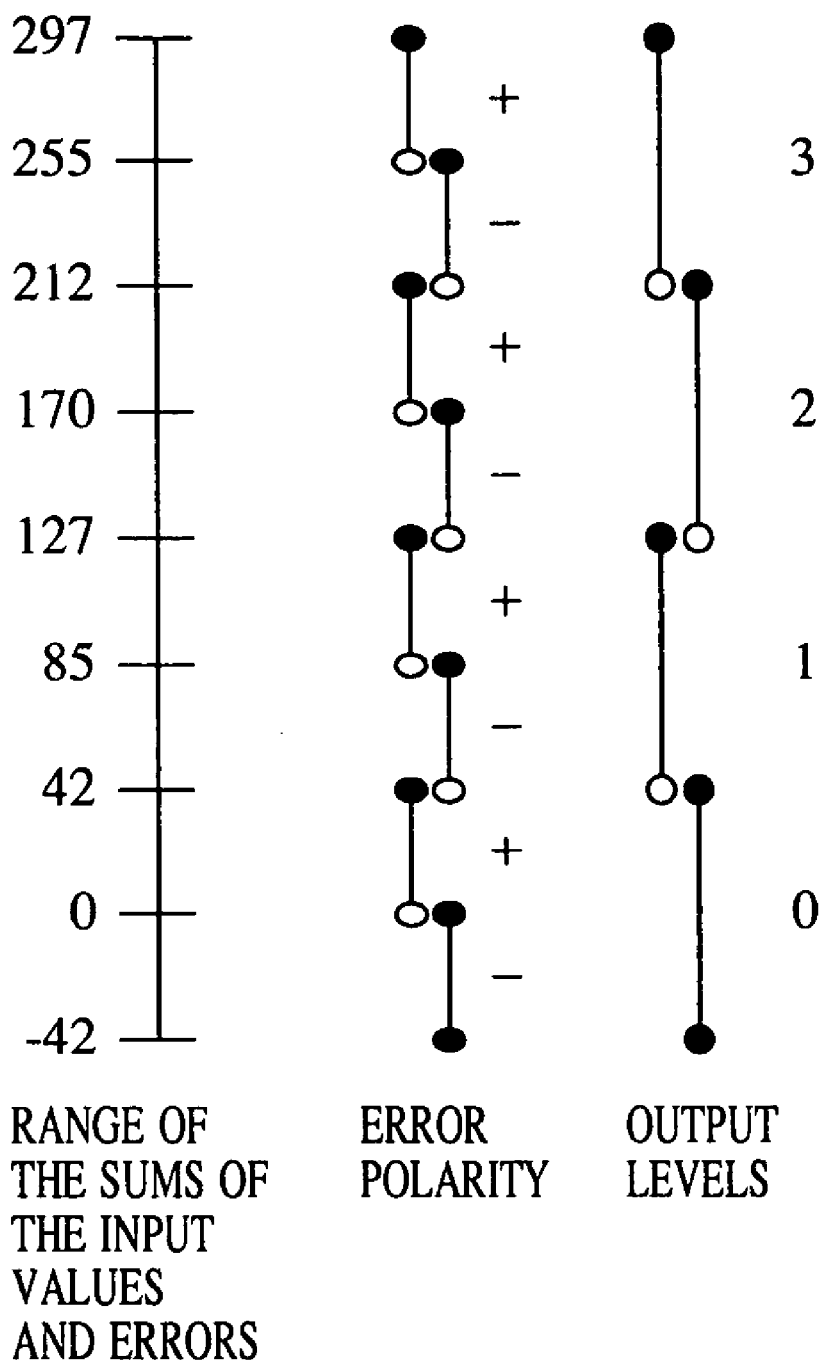
FIG. 8 is a drawing illustrating 4-level quantization.
Figure 9:
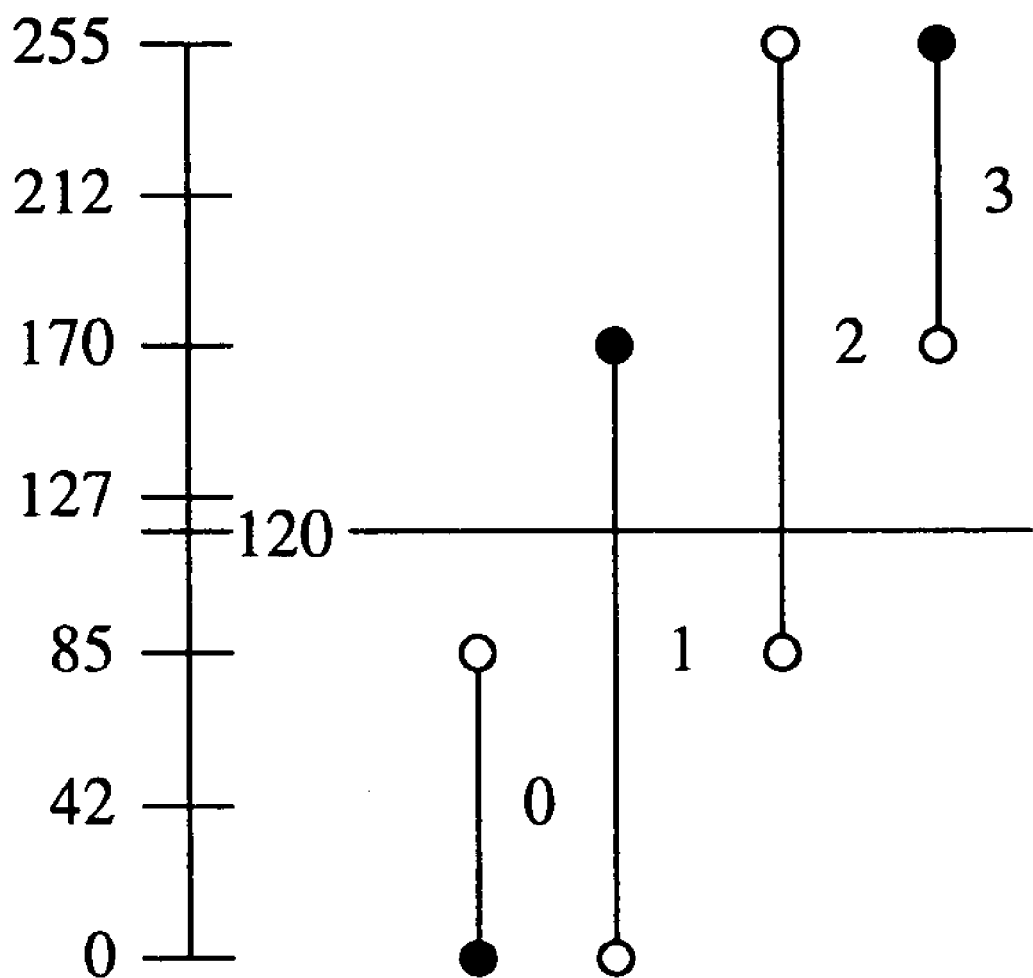
FIG. 9 is a drawing illustrating 4-level quantization.
Figure 10:
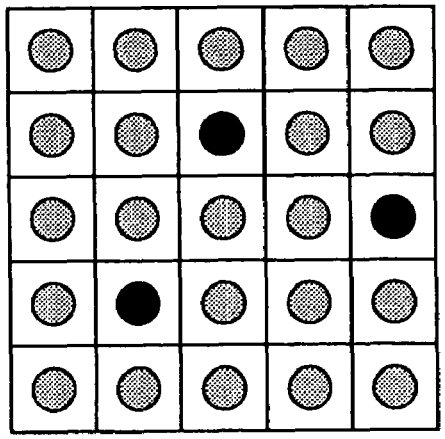
FIG. 10 is a drawing showing an arrangement of ink dots expressed in level 2.

In the LUT 1, the input data is multiplied by a denominator (e.g., 256 as shown in FIG. 5) of an allocation coefficient for error allocation. An adder 2 adds, to the 16-bit data from the LUT 1, error data from a pixel for which quantization (halftoning processing) was completed.

The adder 2 adds, to the 16-bit data from the LUT 1, a rounding error (remainder error generated in error allocation) output from a latch circuit 7, an error in a line behind, which is read from an error buffer 14, and an error in a left or right pixel, which is output from a latch circuit 13.

In this embodiment, the error allocation coefficients shown in FIG. 5 are used. The denominator of the error allocation coefficients shown in FIG. 5 is the power of 2 (the eighth power of 2). Data from the adder 2 is divided by the denominator of the allocation coefficients. This division is performed by shifting bits. In a result of operation by the adder 2, upper nine bits including a sign bit correspond to a quotient obtained when the data from the adder 2 is divided by 256, and the sign bit and lower eight bits correspond to a remainder obtained when the data from the adder 2 is divided by 256.

As a result, the quotient (the upper nine bits from the adder 2) is a reference value for referring to an error allocation table 8, while the remainder (the eight bits from the adder 2) is a rounding error not more than 1 which is input to a latch circuit 6.

The latch circuits 6 and 7 allocate the rounding error outside the pixels shown in the error allocation table 8. The rounding error is delayed for two pixels by the latch circuits 6 and 7 before being input to the adder 2 again. The upper nine bits (the quotient obtained when the output of the adder 2 is divided by the eighth power of 2) output from the adder 2 are input as a reference value to the error allocation table 8. The error allocation table 8 is an LUT composed of a random access memory (RAM) or a read only memory (ROM) in which values obtained by multiplying the input data by the denominator of predetermined weight coefficients for quantization errors, and 4-level output data (four levels are expressed using combinations of two bits) corresponding to large, intermediate, and small ink-dot diameters, are stored.

Figure 4:
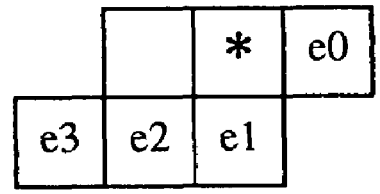
FIG. 4 is a drawing showing error allocation windows according to an embodiment of the present invention.
Figure 4:
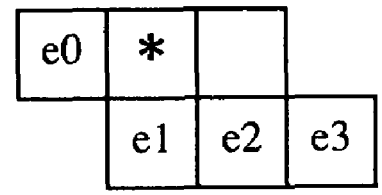

In the error allocation table 8, values corresponding to the error allocation windows (shown in FIG. 4) are stored. Since the respective values are products of input data and the denominator of error allocation coefficients in accordance with quantization errors, they are expressed as 16-bit digits.

In this embodiment, the two error allocation windows (shown in FIG. 4) which are symmetrical are alternately used for each raster in accordance with the direction of processing. Since the error allocation tables are symmetrical, one error allocation table is sufficient for processing. From the error allocation table 8, four values, ek0, ek1, ek2, and ek3 are output in accordance with the value of quotient k output from the adder 2, and the four values correspond to values to e0, e1, e2, and e3 in the error allocation window shown in FIG. 4.

Accordingly, output ek0 is input to a latch circuit 13 so as to be delayed for one pixel, and it is input to the adder 2 again. Output ek1 is input to a latch circuit 9 so as to be delayed for one pixel, and it is input to an adder 10 so as to be added to output ek2. The output of the adder 10 is input to a latch circuit 11 so as to be delayed for one pixel, and it is input to an adder 12 so as to be added to output ek3. The output of the adder 12 is stored in the error buffer 14.

By way of example, when in the output of the adder 2, a quotient represented by the upper nine bits is 1, and a remainder represented by the lower nine bits is 50, 128, 71, 37, and 20, which are respectively allocated as error data to e0, e1, e2, and e3 in the error allocation window, and 50 is allocated as error data to a pixel on the right of e0.

In this embodiment, an area in which error data is stored is positioned two pixels away on the right or left of the pixel of interest in accordance with the direction of quantization. The direction of quantization is switched for each raster.

The circuit shown in FIG. 3 switches the direction of quantization for each line of input data between the direction of the arrow pointing to the right and the direction of the arrow pointing to the left. As shown in FIG. 3, the storage position of the error data output from the adder 12 to the error buffer 14 changes in accordance with the processing in the direction of the arrow pointing the right and the processing in the direction of the arrow pointing the left. Control of the storage position is performed by a control circuit (not shown).

By switching the processing direction for each line between the direction of the arrow pointing the right and the direction of the arrow pointing the left, generation of a characteristic stripe pattern, which is a problem occurring when error diffusion, can be prevented.

In addition, in the error allocation table 8, data obtained by quantization, which correspond to values expressed by the upper nine bits, are stored beforehand. In accordance with the values of the upper-9-bit quotient output from the adder 2, o0 and o1 are output, and large, intermediate, and small ink-dot diameters to be used are determined by combinations of o0 and o1.

In other words, no recording, the small dot, the intermediate dot, and the large dot are respectively determined for combinations 00, 01, 10, and 11 of o0 and o1.

These 4-level outputs based on combinations of o0 and o1 are stored in the printer buffer 120C, and the printer head 103C forms an image based on the stored outputs.

The above-described processes complete pseudogradation processing for the input data. Accordingly, by repeatedly performing the above-described processes while shifting the direction of processing for each pixel, pseudogradation processing for the entire image can be performed.

FIG. 6 shows details of the error allocation table 8.

In the detailed error allocation table 8, the figures in the leftest column indicate index values that are referred to by the upper nine bits of the output of the adder 2.

In the detailed error allocation table 8, when the row (hatched in FIG. 6) at an index value of 100 is noted, a combination of o0 and o1 as an output would, normally, expectedly or fundamentally be 01 but 10 is stored. In addition, errors for the output would be fundamentally be as follows:

$e0 = (100-85) \times 128 = 1920;$ $e1 = (100-85) \times 71 = 1065;$ $e2 = (100-85) \times 37 = 555;$ and $e3 = (100-85) \times 20 = 300.$ However, the errors are actually stored as follows:

$e0 = (100-170) \times 128 = -8960;$ $e1 = (100-170) \times 71 = -4970;$ $e2 = (100-170) \times 37 = -2590;$ and $e3 = (100-170) \times 20 = -1400.$ By using the above-described technique, output level 2 (a combination of o0 and o1 is 10) can be output for an input level based on which output level 2 cannot be fundamentally output. Consequently, adding low frequency noise causes image granularity to deteriorate, which prevents the pseudocontour from noticeably appearing.

In other words, switching to the intermediate dots is not performed until a normal index value of 128 since a line of dot positions in which the intermediate dots are alternately arranged for the small dots looks as a pseudocontour. By causing the intermediate dots to appear at an index value of 100, the intermediate dots can be mixed among the small dots at a lower density than the normal, which prevents the pseudocontour from noticeably appearing.

Figure 11:
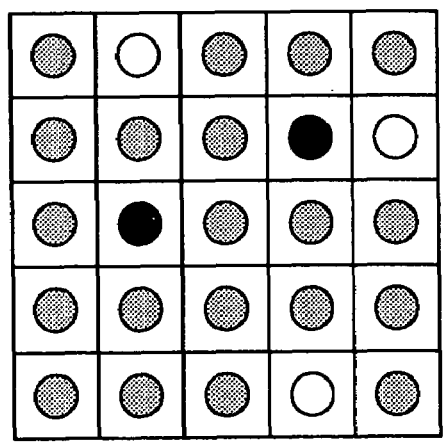
FIG. 11 is a drawing showing an arrangement of ink dots expressed in an embodiment of the present invention.

According to this embodiment, by outputting a different value from a quantized data to be fundamentally output when the sum of an input value and an error is a predetermined value, a pseudocontour is prevented from noticeably appearing. This is because a certain input level fundamentally expressed in two output levels can be expressed in three levels as shown in FIG. 11. Therefore, advantages similar to those obtained by addition of low frequency noise are expected. In other words, adding low frequency noise causes image granularity to deteriorate, which prevents the pseudocontour from noticeably appearing.

In this embodiment, errors are stored, even when the output level is changed. Thus, the density of the output image is macroscopically not affected.

In this embodiment, the case where the index value is 100 for outputting a different level from a fundamental level to be output has been described. However, the index value may be changed, and in response to a plurality of index values (e.g., index values of 1, 100, and 169), different levels can be output.

In the case where the output is binary data, that is, whether dots are printed, by changing a normal value of 0 to 1 at a certain level less than an index value of 128 that is the border between 0 and 1, the above-described problem in which dots suddenly appear in a density region to form a pseudocontour can be solved.

In addition, in this embodiment, although the lower 8-bit data from the adder 2 represents any value of 0 to 255, the 8-bit remainder data (0 to 255) is 0/256 to 255/256, that is, a value less than 1 for an 8-bit input data (0 to 255) because the input data is multiplied by 256 in the LUT 1. This can reduce the rounding errors, and in particular, enhances the image quality of a highlight.

According to the above-described embodiment, by computing binarized errors multiplied by the denominator of weight coefficients and quantized data beforehand, and storing the computed values in a table, a multiplier and a divider for each weight coefficient can be omitted to reduce the circuit size, and high speed processing is realized. In addition, by finding a total of an input pixel density and errors allocated from surrounding pixels, selecting based on the total an error stored in the table, allocating the selected error to the surrounding pixels, and allocating a remainder to the surrounding pixels, also the weight coefficients can be set to have flexibility, and a rounding error can be set from 0 to a value less than 1, whereby image quality including a highlight portion can be enhanced.

In the above-described embodiment, 8-bit multilevel image data is used as the input image pixel data. However, the input image pixel data may be expressed in a plurality of bits such as four bits, twelve bits, and sixteen bits.

In the above-described embodiment, four levels are used as output levels, and it is assumed that a type of ink-jet recording apparatus using large, intermediate, and small ink dots is used. However, the present invention is not limited to the above-described embodiment, but can be applied to the case where two levels, three levels, and four levels are used as output levels. Also the output means is not limited to the above-described use for the large, intermediate, and small dots. The present invention can be easily applied to a recording apparatus using multigration inks having different densities, a recording apparatus using the dot pattern method that uses a plurality of dots to form one level, or a recording apparatus that expresses multigrations by performing repeatedly recording with a type of ink In the above-described embodiment, droplets discharged from recording heads are ink, and the liquid of a container is ink. However, what is contained is not limited to ink. For example, a liquid, such as a treatment liquid to be discharged onto a recording medium in order to enhance the fixation and water resistance of a recording image the image quality, may be contained.

In the above-described embodiment, among ink-jet recording methods, by using a method in which a means (e.g., an electrothermal transducer or a laser, etc.) for generating thermal energy as energy causing the discharging of ink is used so that the thermal energy causes the ink to change in state, the density and definition of recording can be increased.

Regarding typical construction and principles therefor, a method using basic principles disclosed in U.S. Pat. Nos. 4,723,129 and 4,740,796 is preferable. This method can be applied to either a drop-on-demand type or a continuous type. In particular, the application to the drop-on-demand type is effective because the drop-on-demand type applies at least one driving signal for providing a rapid temperature increase exceeding film boiling, which corresponds to recording information, to electrothermal transducers arranged for sheets and a liquid path holding ink so that the electrothermal transducers generate thermal energy and film boiling occurs on the thermally active surfaces of recording heads, bubbles can be consequently formed in the liquid (ink) having a one-to-one correspondence with the driving signal. The growth and contraction of the bubbles discharges the liquid (ink) via a discharging orifice, so that at least one droplet is formed. In the case where the driving signal is set to have a pulse form, the application to the drop-on-demand type is more preferable because the bubbles instantly grow and contract at appropriate time, and in particular, this achieves the discharging of the liquid (ink) with high response.

Regarding the pulse driving signal, types of signal as described in U.S. Pat. Nos. 4,463,359 and 4,345,262 are appropriate. Higher quality of recording can be obtained by employing conditions described in U.S. Pat. No. 4,313,124 disclosing an invention concerning a temperature increase factor of the thermally active surface.

Regarding the recording head structure, in addition to a combination (linear liquid flow path or orthogonal liquid flow path) of a discharging orifice, a liquid path, and an electrothermal transducer, structures using the inventions in U.S. Pat. Nos. 4,558,333, and 4,459,600, which disclose that a thermally active surface is provided in a bending region, are also included in the present invention. In addition, the recording head structure may be formed based on Japanese Patent Laid-Open No. 59-123670 disclosing that a common slot is used as the discharging orifice of an electrothermal transducer with respect to a plurality of electrothermal transducers, and Japanese Patent Laid-Open No. 59-138461 disclosing that an opening for absorbing pressure waves is provided to correspond to a discharging orifice.

A full-line type of recording head having a length corresponding to the width of a largest recording medium on which the recording apparatus can perform recording is set up by employing a structure that uses a combination of a plurality of recording heads to satisfy the condition, or an integral structure in which a single recording head is formed, as disclosed in these Japanese Patent Laid-Open publications.

In addition, not only a cartridge type of recording head in which the recording heads described in the above-described embodiment are integrally provided with an ink container, but also an exchangeable chip type of recording head in which when the recording head is mounted to the recording apparatus, it can be electrically connected to the recording apparatus and is supplied with ink from the recording apparatus, may be used.

Moreover, it is preferable to add units to the recording head, such as a restoration unit and an auxiliary unit, because these units enhance the stability of recording. Specifically, these units are a recording head capping unit, a cleaning unit, a pressure or attraction unit, an electrothermal transducer or a different type of heating element, and an auxiliary heating unit comprised of the electrothermal transducer and the heating element. Provision of an auxiliary discharging mode for discharging different from that in recording is effective in performing stable recording.

Not only a recording mode for recording using only a main color such as black, but also either a mode for multicolor recording using different colors or a mode for full color recording by color mixing may be provided to the recording apparatus of the present invention by using an integral recording head or a combination of recording heads.

The above-described embodiment has been described on the assumption that ink is a liquid. However, ink that solidifies at room temperature or lower, or ink that softens or liquefies at room temperature may be used. In ink-jet recording, in general, the temperature of ink is adjusted between 30° C. and 70° C. so that the ink viscosity is in a stable discharging range. Accordingly, a type of ink that is a liquid when an operation recording signal is supplied may be used.

In addition, in order to actively prevent a temperature rise caused by thermal energy by consuming the rise as the energy of a change from the solid state into the liquid state of ink, or in order to prevent ink from vaporizing, a type of ink that solidifies when left as it is and that liquefies when heated may be used. In other words, the present invention can be applied to a type of recording in which ink is liquefied when is supplied with thermal energy in accordance with recording signals, and the liquid ink is discharged, and a type of recording using ink that is liquefied when it is supplied with thermal energy. In these cases, the ink may be provided counter to an electrothermal transducer, with the ink held as a liquid or solid by porous sheet depressions or throughholes. In the present invention, the most appropriate type of ink-jet recording for each type of ink is a method using the above-described film boiling.

The recording apparatus of the present invention may be an integral or separate type of image-outputting terminal for an information processing apparatus such as a computer, a copying machine combined with a reader, or a facsimile machine having transmitting and receiving functions.

The present invention may be applied to a system consisting of apparatuses such as a host computer, an interface unit, a reader, and a printer, or to a single apparatus (e.g., a copying machine or a facsimile machine).

Obviously, the foregoing object of the present invention is also achieved by providing, to the computer system 20, a recording medium storing the program code of software for realizing the functions shown in FIG. 3, and reading and executing the stored program code by the processor (or a CPU or MPU) of the computer system 20.

In this case, the program code read from the recording medium, itself, realizes the functions in the above-described embodiment. Accordingly, the recording medium storing the program code is included in the present invention.

Concerning the recording medium for supplying the program code, floppy disks, hard disks, optical disks, magneto-optical disks, CD-ROMs, CD-Rs, magnetic tapes, non-volatile memory cards, read only memories, etc., may be used.

The execution of the program code read by the processor obviously includes not only the case where the functions in the above-described embodiment are realized, but also the case where based on instructions from the program code, an operating system operating in the processor executes some or all of actual processes, whereby the functions in the above-described embodiment are realized.

In addition, the execution of the program code read by the processor obviously includes the case where the program code read from the recording medium is stored in a memory provided in an add-in board or unit for the processor, and a CPU or the like included in the add-in board or unit executes some or all of actual processes, whereby the functions in the above-described embodiment are realized.

Although the present invention has been described using an embodiment thereof, it is to be understood that the present invention is not limited to the above-described embodiment but various modifications and modes may be made without departing from the spirit and scope of the present invention by a person skilled in the art.

What is claimed is:

1. An image processing apparatus comprising:
   input means for inputting image data;
   processing means for quantizing error-correction data obtained by adding error data to the image data input by said input means so that data having at least two levels are generated; and
   allocation means for allocating the error data generated when the quantization is performed to image data which are not quantized,
   wherein, in response to a predetermined level of the error-correction data, said processing means uses a different processing from fundamental processing, and outputs, as a result of quantization, a different level from a level resulting from fundamental processing for said predetermined level so as to prevent a pseudocontour from being generated, the different processing including adding noise components to output data to achieve the different level.

2. An image processing apparatus according to claim 1, wherein said allocation means allocates, as the error data, the difference between said error-correction data and the quantized data having a different level from a level resulting from fundamental processing.

3. An image processing apparatus according to claim 1, further comprising an output means for outputting, based on the data having at least two levels from said processing means, an image in which the sizes of dots are controlled.

4. An image processing apparatus according to claim 3, wherein said output means uses ink-jet printing to record an image.

5. An image processing method comprising:
   an input step, of inputting image data;
   a processing step, of quantizing error-correction data obtained by adding error data to the image data input in said input step so that data having at least two levels are generated; and
   an allocation step, of allocating the error data generated when the quantization is performed to image data which are not quantized,
   wherein, in response to a predetermined level of the error-correction data, in said processing step, there is used a different processing from fundamental processing, and a different level from a level resulting from fundamental processing for said predetermined level is output as a result of quantization so as to prevent a pseudocontour from being generated, the different processing including adding noise components to output data to achieve the different level.

6. An image processing method according to claim 5, wherein, in said allocation step, the difference between the error-correction data and the quantized data having a different level from a level resulting from fundamental processing is allocated as the error data.

7. An image processing method according to claim 5, further comprising the step of outputting, based on the data having at least two levels from said processing step, an image in which the sizes of dots are controlled.

8. An image processing method according to claim 5, wherein, in said output step, ink-jet printing is used to record an image.

9. An image processing method for allocating, as a quantized error, the difference between an input image density and a quantized image density to surrounding pixels around a pixel of interest, and setting the average of the quantized densities to be equal to the input image density, said image processing method comprising the steps of:
   finding error-correction data by adding the input image density and error data allocated from the surrounding pixels; and
   outputting, based on the error-correction data obtained in said finding step, error data and predetermined quantized data for the surrounding pixels, which are pre-stored in a table,
   wherein, in response to a predetermined level of the error-correction data, in said outputting step, a different level from a level resulting from fundamental processing for said predetermined level is output so as to prevent a pseudocontour from being generated, the different level being such as to reflect addition of noise components to the output data to achieve the different level.

* * * * *